UNITED STATES PATENT OFFICE.

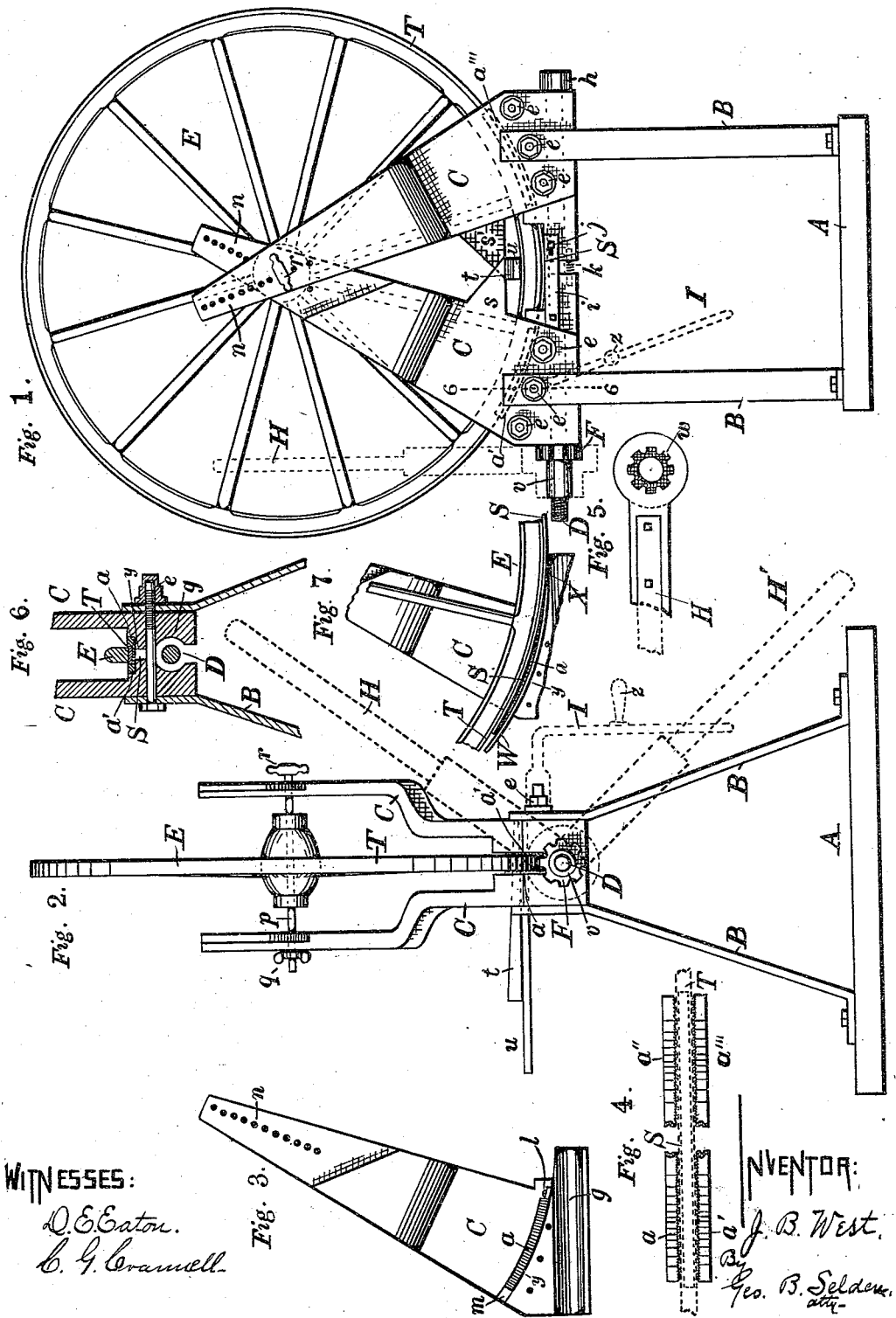

JONATHAN B. WEST, OF ROCHESTER, NEW YORK.

TIRE-SETTING MACHINE.

SPECIFICATION forming part of Letters Patent No. 555,060, dated February 18, 1896.

Application filed January 16, 1894. Serial No. 497,086. (No model.)

*To all whom it may concern:*

Be it known that I, JONATHAN B. WEST, a citizen of the United States, residing at Rochester, in the county of Monroe and State of New York, have invented an Improved Tire-Setting Machine, of which the following is a specification, reference being had to the accompanying drawings.

My invention relates to an improved machine for setting tires, which improvement is fully described and illustrated in the following specification and the accompanying drawings, the novel features thereof being specified in the claims annexed to the said specification.

In the accompanying drawings, representing my improved tire-setting machinery, Figure 1 is a side elevation. Fig. 2 is an end view. Fig. 3 represents one of the standards detached, as seen from the inside. Fig. 4 represents the clamp-jaws detached. Fig. 5 represents the socket-wrench. Fig. 6 is a section on the line 6 6, Fig. 1. Fig. 7 represents a modification of the device for supporting the tire from the outside during the upsetting operation.

My improved tire-setting machine is designed more particularly for setting tires cold on the wheel, and it operates by means of two pairs of clamp-jaws, which are adjustable to engage at suitable distances apart with the edges of tire, and which pairs are then drawn or moved toward each other, thus upsetting the tire between them and shortening it so that it becomes tight on the wheel.

The machine comprises suitable standards which carry the adjustable clamp-jaws and support the wheel, means for adjusting the jaws so as to clamp them against the edges of the tires, means for causing the two pairs of jaws to move relatively to each other, a support for the inside of the felly between the jaws, a support for the outside of the felly, and also a suitable supporting framework, if desired.

In the machine of the accompanying drawings, A represents a suitable base or bed plate; B B, uprights or arms attached thereto and serving to sustain the standards C C, which carry the clamp-bolts $e$ and the upsetting-screw D. The jaws $a$ $a'$ constitute one set or pair and the jaws $a''$ $a'''$ another set or pair.

The clamp-jaws are curved, serrated on their opposing surfaces, and attached to the interior of the standards in any suitable way in such fashion that they may engage with the edges of the tire of a wheel placed between the standards. The bolts and nuts $e$ are employed to adjust the lower ends of the standards toward each other, engaging the toothed clamps firmly with the edges of the tire. The two pairs of jaws are then caused to move toward each other by turning the nut F on the screw D by means of the lever or socket-wrench H. The framework, if used, is made of such a character as to permit the adjustment of the standards in engaging the clamps with the edges of the tire and in drawing the two pairs of clamps toward each other.

In the machine of the drawings the uprights B are made of wrought-iron, which will yield sufficiently to permit the movements of the clamps. The inner opposing surfaces of the standards are recessed, as indicated at $g$, Fig. 3, to permit the screw D to pass through between them, the screw being provided with a head $h$ at one end outside the standards. The inner ends of the standards are connected together on one or both sides by a strap $i$, Fig. 1, and bolts, one of which, $j$, passes through a slotted hole in the strap, so as to permit the movements of the standards toward each other. A spring $k$ serves to keep the standards separated, except when moved toward each other by the nut F on the screw-rod D. The clamp-jaws $a$ $a'$ $a''$ $a'''$ are secured in suitable curved recesses in the inner faces of the standards, being fastened by screws $l$, Fig. 3, at one end and resting against an abutment $m$ at the other. The clamp-jaws are preferably made somewhat wider than the thickness of the heaviest tire for which the machine is designed, in order that the teeth of the clamps may engage with the edges of tires of differing curvature on wheels of different sizes. The jaws are preferably hardened and arranged with their teeth pointing inward to properly engage with the edges of the tire, as indicated in Fig. 4.

In order to adapt the machine to wheels of different sizes, the standards C are provided with rows of holes $n$, Fig. 1, to receive the rod $p$, which passes through the hub and supports the wheel. The rod $p$ is provided on one end with the handpiece r and at the other with the clamp-nut q. For a larger wheel than that represented in the accompanying drawings the rod p is placed in some of the upper holes in the rows n, the upper ends of the standards being separated, the standards turning on the bolts e in the framework B, this movement shifting the clamp-jaws to correspond sufficiently closely with the increased curvature of the tire of the larger wheel, the recesses g being large enough to permit this arrangement. The outside of the tire is supported during the upsetting operation by the shoulders y formed on the standards immediately below the clamp-jaws. I also sometimes employ a metallic strip S, Figs. 1 and 7, which is inserted between the outside of the tire and the shoulders y, and fits accurately against the tire and supports it throughout its entire length between the two pairs of clamps. This strip is slightly narrower than the tire, is preferably of steel, and effectually bridges the joint at the center between the standards.

In order to support the felly from the inside during the upsetting of the tire, I form on the standards C two or more lugs or projections s s', Fig. 1, and insert between them and the interior of the felly a wedge t, Fig. 2, which, being driven home, sustains the felly against the pressure produced by the inward movement of the clamp-jaws. A bar u, Fig. 2, may be inserted between the wedge and the felly. A screw or other device may be employed for the purpose of sustaining the felly; but I prefer the wedge as affording a sufficient range of adjustment and as being simple and quick. The wedge forces the tire into contact with the shoulders y or the strip S, which rests on the shoulders, and the tire is thus effectually prevented from kinking in either direction when the clamp-jaws are moved toward each other to upset or shorten it. The bolt p through the standards forms a central pivot, which makes the two pairs of standards swing toward each other on the exact circle of the tire of the wheel operated on and prevents them from dodging either up or down during the upsetting.

The clamp-jaws are usually made for a thirty-six-inch wheel, and consequently when a larger—say fifty-two-inch—wheel is placed in the machine, the curve being different it necessarily rests on a slight apex on the shoulders y near the center, between the standards, touching again at the outer ends. For the larger sizes of wheels I therefore insert between the shoulders y and the tire or strip S the wedges W, Fig. 7, the inner ends of which are beveled, and when driven home support the outside of the tire near the inner ends of the shoulders, as represented at X.

The wrench H is provided with a socket w, Fig. 5, of a shape corresponding with that of the nut F. The nut is provided with a cylindrical hub v, on which the socket fits, so that the operator having turned the lever from H to H', Fig. 2, slides the socket laterally off of the nut, but not off of the hub, so that he can readily return the lever to the first position and engage it with the nut in order to impart another partial turn thereto.

I represents a socket-wrench employed for turning up the nuts e to clamp the jaws on the tire. This wrench is provided with a projecting handle z, which is used to turn the nuts up until they begin to catch on the clamps, after which greater leverage is secured by employing the extending end of the lever.

The manner of operating my improved tire-setter will have been already understood from the preceding description. A wheel with loose tire having been placed between the standards, the rod p is inserted through the hub, and, the clamp-jaws having been adjusted so as to firmly engage with the edges of the tire by turning up the nuts e, the wedge t is inserted and the lever H is then operated to turn up the nut F on the screw D, thereby drawing the clamps together and upsetting the tire between the clamps, thus shortening it and rendering it tight on the felly. The tire may be upset at two or more different points in its circumference if necessary. The whole operation is performed quickly and easily and without injury to the wheel in any way.

I claim—

1. In a tire-setting machine, the combination of two sets or pairs of relatively adjustable and movable tire-edge-clamping jaws, means for moving the pairs of jaws relatively to each other to upset the tire, and suitable means for supporting the wheel, substantially as described.

2. In a tire-setting machine, the combination of two sets or pairs of relatively adjustable and movable tire-edge-clamping jaws, means for moving the pairs of jaws relatively to each other to upset the tire, and an adjustable device for sustaining the felly, substantially as described.

3. In a tire-setting machine, the combination of two sets or pairs of relatively adjustable and movable tire-edge-clamping jaws, means for moving the pairs of jaws relatively to each other to upset the tire, suitable means for supporting the wheel, and an adjustable device for sustaining the felly, substantially as described.

4. The combination, in a machine for setting tires on the wheel, of serrated clamps adapted to engage with the edge of the tire at a suitable distance apart, means for moving the clamps relatively to each other to upset the tire, and a support for the inside of the felly during the upsetting operation, substantially as described.

5. The combination, in a machine for setting tires on the wheel, of serrated clamping-jaws adapted to engage with the edge of the tire at suitable distances apart, and capable of being shifted to suit tires of different curvature, means for moving the clamps relatively to each other to upset the tire, and an adjustable support for the inside of the felly during the upsetting operation, substantially as described.

6. The combination, in a tire-setting machine, of the adjustable and movable clamps $a\ a'\ a''\ a'''$, the adjusting-screws $e$, the upsetting-screw D, and suitable connecting mechanism, substantially as described.

7. The combination, in a tire-setting machine, of the standards C C, the rod $p$, the serrated clamps $a\ a'\ a''\ a'''$, the adjusting-screws $e$, and the upsetting-screw D, substantially as described.

8. The combination, in a tire-setting machine, of the standards C C, the rod $p$, the serrated clamps $a\ a'\ a''\ a'''$, the adjusting-screws $e$, the upsetting-screw D, and the wedge $t$, substantially as described.

9. The combination, in a tire-setting machine, of the standards C C, the serrated clamps $a\ a'\ a''\ a'''$, the adjusting-screws $e$, the upsetting-screw D, and the spring $k$, substantially as described.

10. The combination, in a tire-setting machine, of the adjustable and movable clamps $a\ a'\ a''\ a'''$, the adjusting-screws $e$, the upsetting-screw D, suitable connecting mechanism, and a flexible or yielding support, substantially as described.

11. The combination, in a tire-setting machine, of the standards C C, the rod $p$, the clamps $a\ a'\ a''\ a'''$, the adjusting-screws $e$, the upsetting-screw, and the yielding support B, substantially as described.

12. The combination, in a machine for setting tires on the wheel of serrated clamps adapted to engage with the edge of the tire at a suitable distance apart, means for moving the clamps relatively to each other to upset the tire, a support for the outside of the tire, and a support for the inside of the felly during the upsetting operation, substantially as described.

13. The combination, in a tire-setting machine of the standards C C, the shoulders $y$ adapted to sustain the tire, the rod $p$, the serrated clamps $a\ a'\ a''\ a'''$, the adjusting-screws $e$, and the upsetting-screw D, substantially as described.

14. The combination, in a tire-setting machine of the standards C C, the shoulders $y$, adapted to sustain the tire, the rod $p$, the serrated clamps $a\ a'\ a''\ a'''$, the adjusting-screws $e$, the upsetting-screw D, and the supporting-strip S, substantially as described.

15. The combination, in a tire-setting machine, of the standards C C, the shoulders $y$, adapted to sustain the tire the rod $p$, the serrated clamps $a\ a'\ a''\ a'''$, the adjusting-screws $e$, the upsetting-screw D, and the wedges W, substantially as described.

JONATHAN B. WEST.

Witnesses:
   GEO. B. SELDEN,
   C. G. CRANNELL.